(12) United States Patent
Matsui (10) Patent No.: US 7,694,976 B2
(45) Date of Patent: Apr. 13, 2010

(54) SEALING DEVICE WITH SENSOR

(75) Inventor: Hiroki Matsui, Fukushima (JP)

(73) Assignee: NOK Corporation, Tokyo (JP)

( * ) Notice: Subject to any disclaimer, the term of this patent is extended or adjusted under 35 U.S.C. 154(b) by 94 days.

(21) Appl. No.: 11/596,997

(22) PCT Filed: Jun. 9, 2005

(86) PCT No.: PCT/JP2005/010551

§ 371 (c)(1),
(2), (4) Date: Nov. 20, 2006

(87) PCT Pub. No.: WO2006/001176

PCT Pub. Date: Jan. 5, 2006

(65) Prior Publication Data

US 2008/0061511 A1    Mar. 13, 2008

(30) Foreign Application Priority Data

Jun. 28, 2004    (JP) .............................. 2004-189245

(51) Int. Cl.
*F16J 15/32* (2006.01)
(52) U.S. Cl. ................... 277/317; 277/551; 277/572; 384/448
(58) Field of Classification Search ................ 277/317, 277/551, 549, 571–572; 384/448
See application file for complete search history.

(56) References Cited

U.S. PATENT DOCUMENTS

| | | | |
|---|---|---|---|
| 4,946,296 A | | 8/1990 | Olschewski et al. |
| 5,428,289 A | * | 6/1995 | Sahashi et al. .............. 324/173 |
| 5,458,420 A | | 10/1995 | Otto |
| 5,492,417 A | * | 2/1996 | Baker et al. ................. 384/448 |
| 5,668,426 A | * | 9/1997 | Lamert et al. ............... 310/168 |
| 6,520,507 B2 | * | 2/2003 | Pataille et al. .............. 277/561 |
| 6,533,286 B1 | * | 3/2003 | Eckel et al. ................. 277/551 |

(Continued)

FOREIGN PATENT DOCUMENTS

DE    3 809 904 A    10/1989

(Continued)

OTHER PUBLICATIONS

International Search Report (in English) and WO of ISA (in Japanese) for PCT/JP2005/010551, ISA/JP mailed Aug. 30, 2005.

*Primary Examiner*—Vishal Patel
(74) *Attorney, Agent, or Firm*—Harness, Dickey & Pierce, P.L.C.; Ronald W. Wangerow (57) ABSTRACT

To reduce an installing space and simplify a mounting structure of a sensor (40) of a rotary encoder, a sealing device with a sensor has a retainer (10) having a fitting tube section (11) and an installation flange section (12) expanding outside thereof and fixed to an engine block (2), and a sealing device body (20) fitted to the fitting tube section (11) and slidably contacted with an outer surface of the crank shaft (4), a sensor (40) detecting a rotation of a pulsar ring (30) rotating together with the crank shaft (4) is attached to a sensor installation section (13) in the installation flange section (12), and a pulsar body (32) of the pulsar ring (30) is formed in a cylindrical shape and extends in a circumferential direction coaxial with the fitting tube section (11) between the fitting tube section (11) and the sensor installation section (13).

6 Claims, 5 Drawing Sheets

U.S. PATENT DOCUMENTS

| | | | |
|---|---|---|---|
| 6,561,518 B1 * | 5/2003 | Lutaud | 277/549 |
| 6,974,136 B2 * | 12/2005 | Vignotto et al. | 277/549 |
| 2001/0051010 A1 | 12/2001 | Toda et al. | |
| 2002/0167305 A1 * | 11/2002 | Sentoku et al. | 324/173 |
| 2005/0230920 A1 * | 10/2005 | Toth et al. | 277/317 |

FOREIGN PATENT DOCUMENTS

| | | |
|---|---|---|
| EP | 0 657 738 A | 6/1995 |
| EP | 1 164 318 A2 | 12/2001 |
| EP | 1304575 A2 * | 4/2003 |
| FR | 2 629 155 A | 9/1989 |
| JP | 01-316519 | 12/1989 |
| JP | 7-267059 A | 10/1995 |
| JP | 2001-355742 A | 12/2001 |
| JP | 2004-093554 | 3/2004 |

* cited by examiner

SEALING DEVICE WITH SENSOR

CROSS-REFERENCE TO RELATED APPLICATIONS

This is a nationalization of PCT application of International Publication No. WO 2006/001176 published on Jan. 5, 2006.

TECHNICAL FIELD

The present invention relates to a sealing device sealing an outer periphery of a rotary shaft, and more particularly to a sealing device provided with a sensor of a rotary encoder for detecting an axial rotation.

BACKGROUND ART

In a sealing device provided as a means for axially sealing a crank shaft of an engine, as a sealing device provided in parallel with a magnetic type rotary encoder for detecting a rotation of the engine, there has been conventionally known a structure, for example, disclosed in Japanese Unexamined Patent Publication No. 2004-93554, patent document 1.

In other words, the sealing device is supported to an inner periphery of a non-rotating housing, and is brought into slidable contact with an outer peripheral surface of a crank shaft. A pulsar ring (a pulsar wheel) magnetized in multiple poles in a circumferential direction is attached to a shaft end of the crank shaft, and a magnetic sensor facing to the pulsar ring from an outer peripheral side is attached to the housing so as to be adjacent to the sealing device in an axial direction. The magnetic sensor structures a magnetic type rotary encoder together with the pulsar ring, generates a pulse in correspondence to a change of a magnetic field of the pulsar ring rotating together with the crank shaft, and detects the rotation of the crank shaft.

However, in accordance with the prior art described in the patent document 1 mentioned above, since a sensor and a shaft seal ring are attached to the housing side by side in the axial direction, a dimension in an axial direction of the housing (for example, an engine block) becomes large, and a mounting structure is entirely complicated.

SUMMARY

Problem to be Solved by the Invention

The present invention is made by taking the points mentioned above into consideration, and a technical problem of the present invention is to provide a sealing device with a sensor in which an installing space can be reduced, and a mounting structure of a sensor of a rotary encoder is not complicated.

Means for Solving the Problem

The technical problem mentioned above can be effectively solved by the present invention. In other words, in accordance with a first aspect of the present invention, there is provided a sealing device with a sensor comprising:

a retainer having a fitting tube section to which a rotary shaft is inserted, and an installation flange section expanding from an outer periphery of the fitting tube section and fixed to a stationary side; and a sealing device body fitted to the fitting tube section and slidably brought into close contact with an outer peripheral surface of the rotary shaft, wherein a sensor detecting a rotation of a pulsar ring rotating together with the rotary shaft is attached to a sensor installation section formed in the installation flange section of the retainer.

In the structure mentioned above, the sealing device body is previously integrally fitted to the fitting tube section of the retainer, and the sensor is previously integrally attached to the sensor installation section of the retainer. Accordingly, it is possible to handle the retainer, the sealing device body and the sensor as an integral assembly. Further, the sensor is attached to the sensor installation section of the retainer, thereby being arranged in an outer peripheral side of the sealing device body.

Further, in accordance with a second aspect of the present invention, there is provided a sealing device with a sensor as recited in the first aspect, wherein a detected portion of the pulsar ring is formed in a cylindrical shape, and extends in a circumferential direction coaxial with the fitting tube section through a portion between the fitting tube section of the retainer and the sensor installation section.

In accordance with the structure mentioned above, the sensor, the cylindrical detected portion of the pulsar ring and the sealing device body are provided side by side in a diametrical direction.

EFFECT OF THE INVENTION

In accordance with the sealing device with the sensor on the basis of the first aspect of the present invention, since the sealing device body and the sensor can be previously attached to the retainer, they are formed as the integral assembly and it is easy to handle them and execute the attaching work to a machine.

In accordance with the sealing device with the sensor on the basis of the second aspect of the present invention, in addition to the effect obtained by the first aspect, it is possible to reduce the installing space with respect to the axial direction.

DESCRIPTION OF REFERENCE NUMERALS 1 sealing device
2 engine block
3 oil pan
4 crank shaft
10 retainer
11 fitting tube section
12 installation flange section
13 sensor installation section 20 sealing device body
21 mounting ring
22 seal lip
23 dust lip
30 pulsar ring
31 holder
32 pulsar body
40 sensor
41 magnetic sensor main body
41a detecting surface
42 mounting flange
S labyrinth-shaped space

DETAILED DESCRIPTION

A description will be in detail given below of a preferable embodiment of a sealing device with a sensor in accordance with the present invention with reference to the accompanying drawings. First, FIG. 1 is a view of an installed state of the sealing device with the sensor in accordance with this embodiment as seen from an outer side in an axial direction, FIG. 2 is a cross sectional view along a line II-II in FIG. 1, FIG. 3 is a view of the sealing device with the sensor in accordance with this embodiment as seen from the outer side in the axial direction, FIG. 4 is a cross sectional view along a line IV-IV in FIG. 3, and FIG. 5 is an exploded perspective view showing an example of a mounting structure of the sensor.

Figure 1:
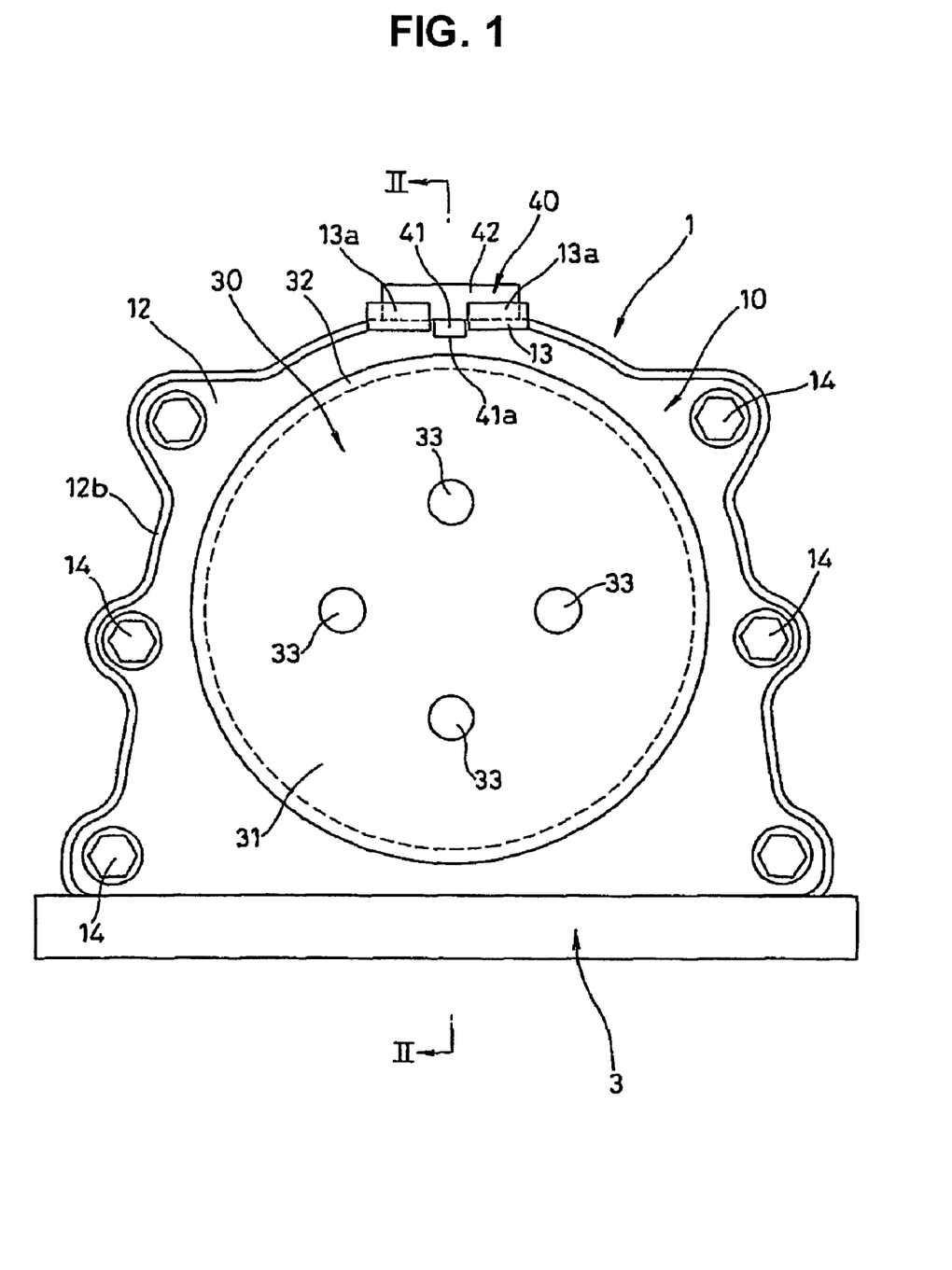
FIG. 1 is a view of an installed state of a sealing device with a sensor in accordance with a preferable embodiment of the present invention as seen from an outer side in an axial direction.
Figure 2:
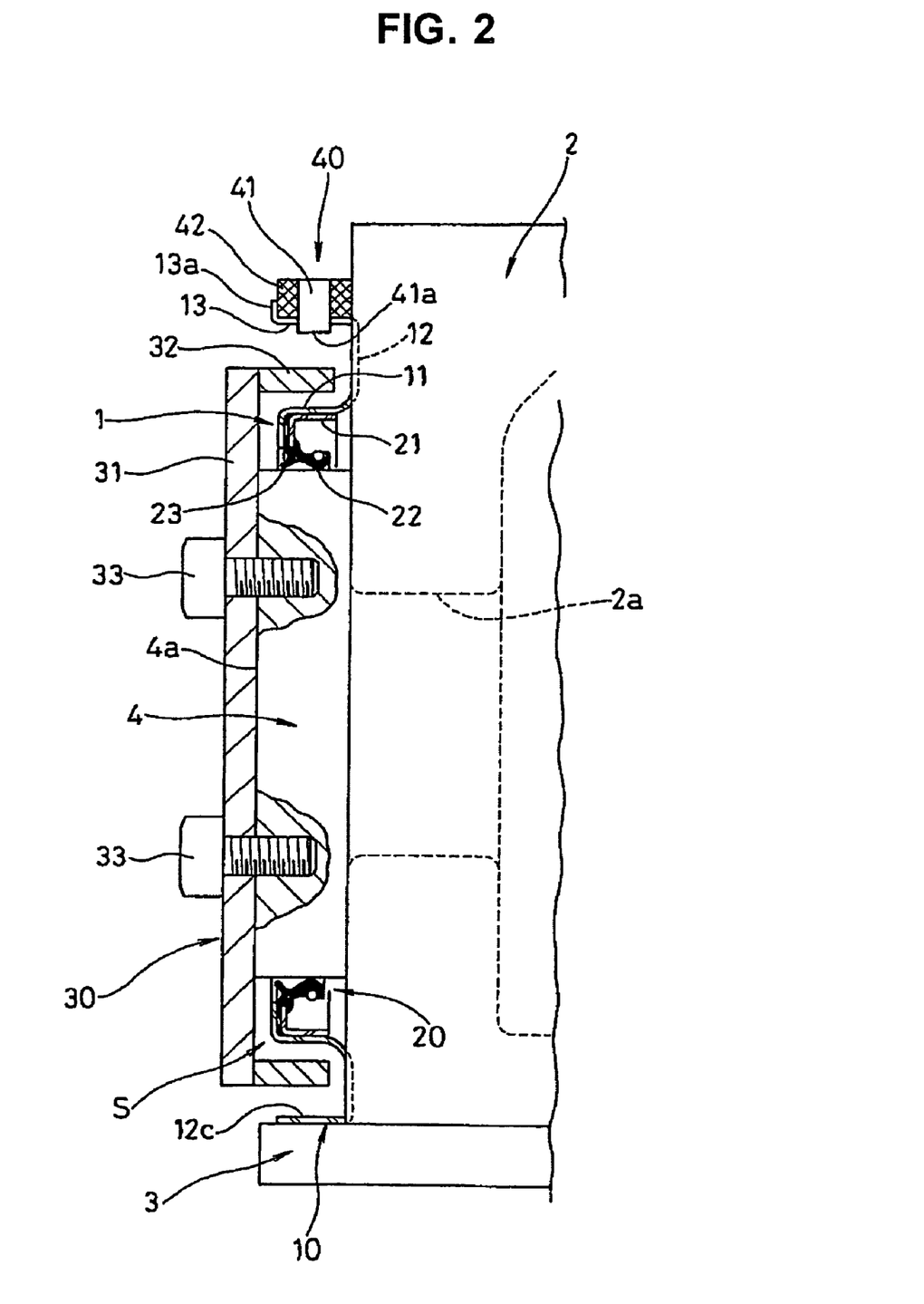
FIG. 2 is a cross sectional view along a line II-II in FIG. 1.

In FIGS. 1 and 2, reference numeral 1 denotes a sealing device in accordance with the present invention. Reference numeral 2 denotes a part (a rear portion) of an engine block of an automotive engine, reference numeral 3 denotes an oil pan, and reference numeral 4 denotes a rear end portion of a crank shaft protruding from a rear portion of the engine block 2. The engine block 2 corresponds to a stationary side described in the first aspect, and the crank shaft 4 corresponds to a rotary shaft described in the first aspect.

The sealing device 1 with the sensor in accordance with the present invention is to seal engine oil supplied for lubricating a bearing portion 2a rotatably supporting the crank shaft 4, and is constituted by a retainer 10 corresponding to a punch press product of a metal plate, and a sealing device body 20 integrally held to the retainer 10.

Figure 3:
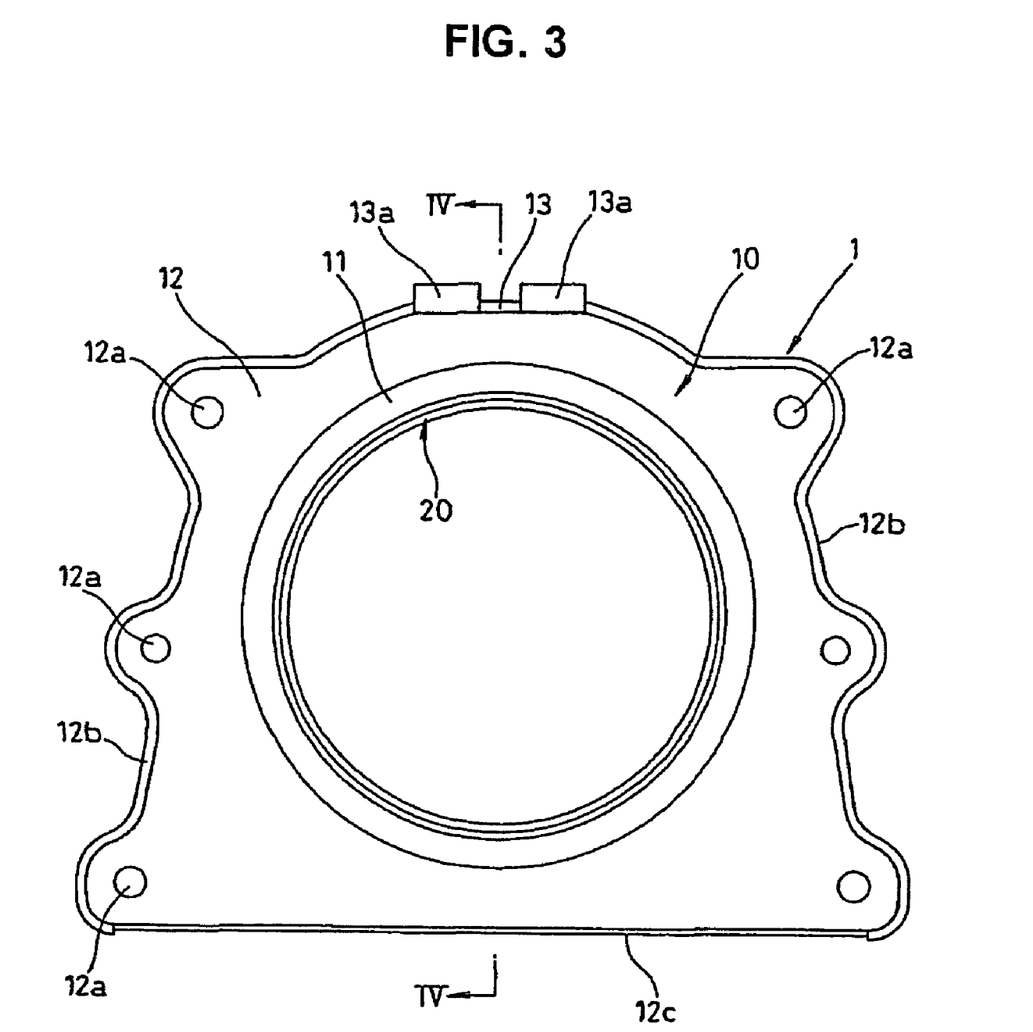
FIG. 3 is a view of the sealing device with the sensor in accordance with the preferable embodiment of the present invention as seen from the outer side in the axial direction.
Figure 4:
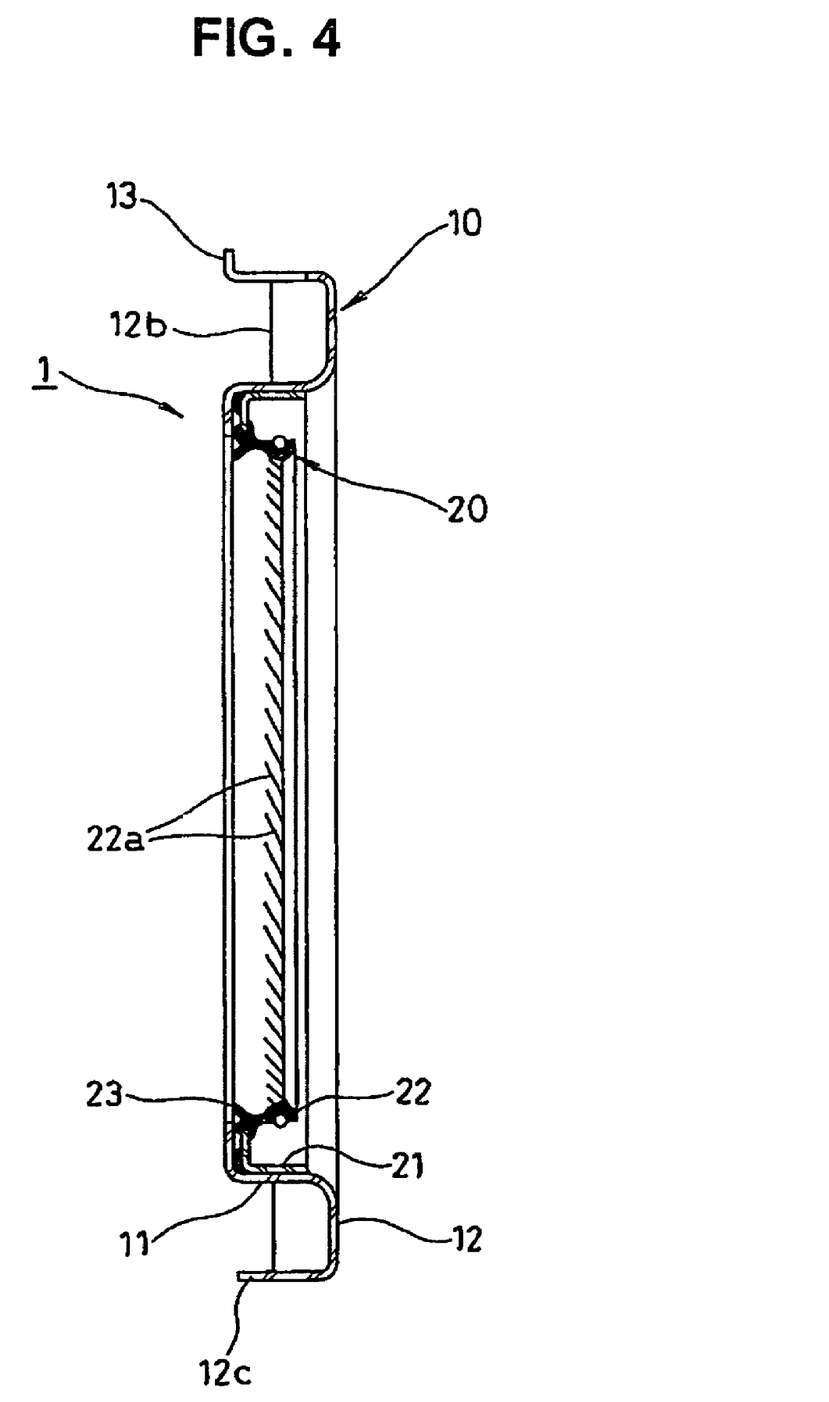
FIG. 4 is a cross sectional view along a line IV-IV in FIG. 3.
Figure 5:
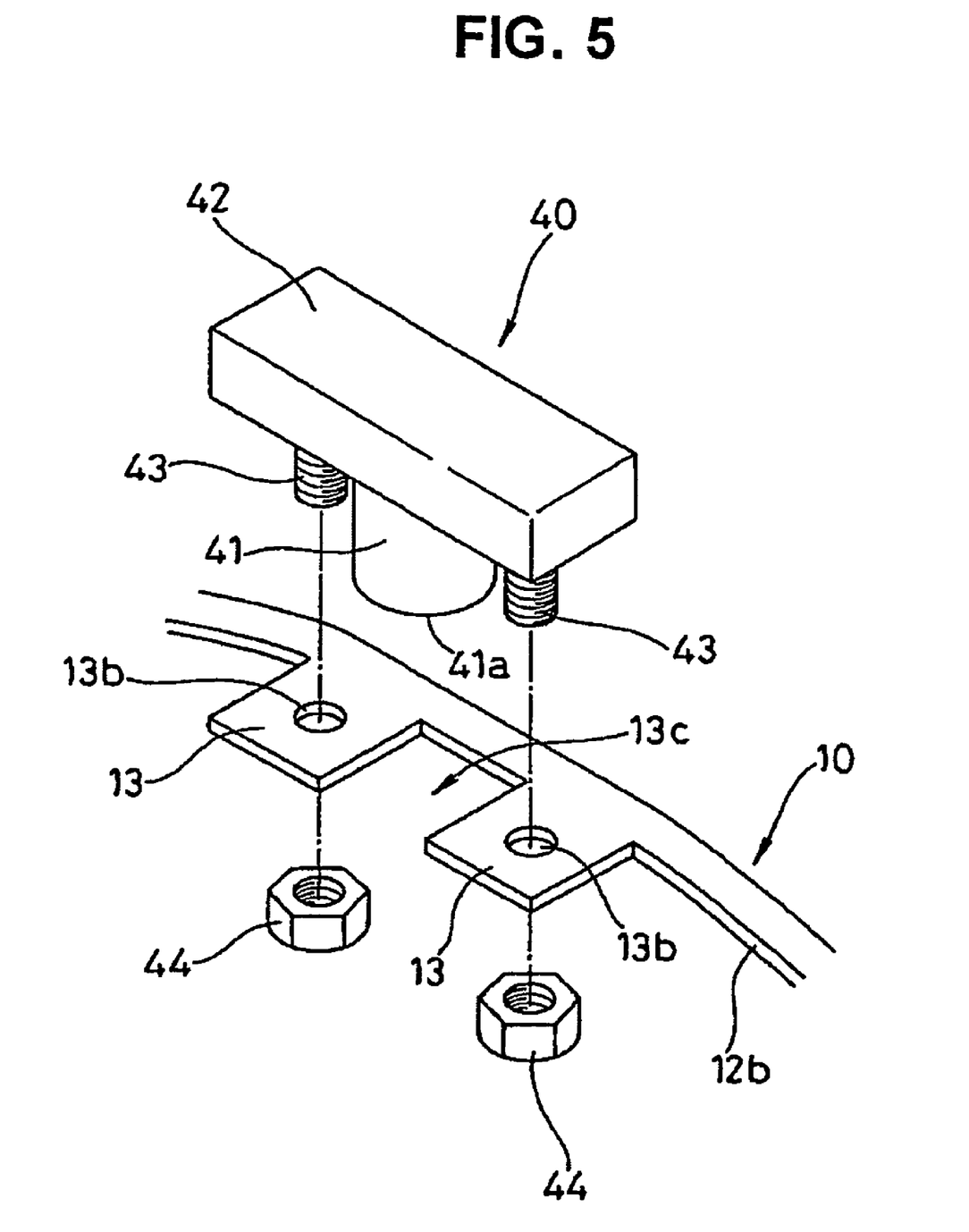
FIG. 5 is an exploded perspective view showing an example of a mounting structure of the sensor.

As shown in FIGS. 3 and 4, the retainer 10 has a cylindrical fitting tube section 11 holding the sealing device body 20 in an inner periphery, and an installation flange section 12 expanding to an outer peripheral side from an end portion at an inner side in an axial direction in the fitting tube section 11. The cylindrical fitting tube section 11 and the installation flange section 12 form a monolithic member. A plurality of coupling holes 12a are provided in the installation flange section 12 at a predetermined interval, and a peripheral edge 12b for reinforcing is formed by bending. Further, a sensor installation section 13 is formed to protrude in an upper portion of the peripheral edge 12b.

The retainer 10 is structured such that the installation flange section 12 is brought into close contact with an outer end surface in an outer peripheral side of the bearing portion 2a in the engine block 2, and is fastened by a plurality of bolts 14 inserted to the respective coupling holes 12a in the installation flange section 12, and a flat surface portion 12c in a lower end of the peripheral edge 12b is connected to an upper edge of the oil pan 3 in accordance with fastening, welding or the like.

The sealing device body 20 is constituted by a mounting ring 21 made of a metal, and a seal lip 22 and a dust lip 23 which are integrally formed in an inner periphery of the mounting ring 21 by a rubber-like elastic material. In detail, the mounting ring 21 is manufactured by punch press of a metal plate, and the seal lip 22 and the dust lip 23 are connected to each other in outer peripheral portions thereof, and are vulcanized and bonded to the mounting ring 21 in a state in which inner peripheral end portions are integrally buried therein.

The seal lip 22 is structured such that an inner peripheral portion close to a leading end is slidably brought into close contact with an outer peripheral surface of the crank shaft 4, and the dust lip 23 is directed to an opposite side to the seal lip 22 and is slidably brought into close contact with the outer peripheral surface of the crank shaft 4 or faces thereto via a small gap. Reference symbol 22a in FIG. 4 denotes protrusions formed in the inner peripheral surface of the seal lip 22 at a predetermined angle with respect to a circumferential direction. The protrusions 22a bring about a screw seal effect of pushing back the engine oil, which is going to pass toward an outer portion of the engine with respect to an outer peripheral surface thereof at a time when the crank shaft 4 rotates, to the engine side.

In the sealing device body 20, the mounting ring 21 is pressed into the inner periphery of the fitting tube section 11 of the retainer 10 at a suitable fastening margin so as to be close fitted, whereby the sealing apparatus main body 20 is held to the retainer 10. Further, in an attached state to the engine block 2 as shown in FIG. 2, the seal lip 22 is directed to the engine block 2 side, and the dust lip 23 is directed to an opposite side to the engine block 2.

Reference numeral 30 in FIGS. 1 and 2 denotes a pulsar ring integrally provided in an axial end of the crank shaft 4. The pulsar ring 30 is constituted by a disc-shaped holder 31 attached to an end surface 4a of the crank shaft 4 via a plurality of mounting bolts 33, and a cylindrical pulsar body 32 integrally provided in an outer peripheral portion of the holder 31.

The pulsar body 32 corresponds to a detected portion described in the second aspect, and is constituted by a cylindrical multipolar magnet, which is made of a synthetic resin or a rubber material mixed with a magnetic powder, for example, a ferrite powder or the like, or a ferromagnetic metal, and in which S poles and N poles are alternately magnetized at a predetermined pitch in a circumferential direction. In the case that the pulsar body is made of the synthetic resin or the rubber material mixed with the magnetic powder such as the ferrite powder or the like, the pulsar body is integrally formed in an outer peripheral surface of a cylinder portion bent from the holder 31.

In this case, the mounting bolts 33 fixing the pulsar ring 30 can be shared with bolts for attaching, for example, a flywheel (not shown) to the end surface 4a of the crank shaft 4.

Reference numeral 40 denotes a sensor fixed to the sensor installation section 13 of the retainer 10 in the sealing device 1. The sensor 40 is constituted by a magnetic sensor main body 41, and an attaching flange 42 integrally formed or bonded to the magnetic sensor main body 41 by a synthetic resin, and is attached to the sensor installation section 13 in the mounting flange 42. Further, a detecting surface 41a of the magnetic sensor main body 41 constituted by a magnetic resistance element or the like faces closely to an outer peripheral surface of the pulsar body 32 in the pulsar ring 30.

In order to fix the mounting flange 42 of the sensor 40 to the sensor installation section 13, various methods can be considered. For example, there is a method of fixing the mounting flange 42 in accordance with caulking by bending the end portion 13a of the sensor installation section 13, as shown in FIGS. 1 and 2. In this case, a bending direction of the end portion 13a of the sensor installation section 13 may be set to an inverse direction (a downward direction) to the illustrated direction, and the sensor 40 may be installed to a lower surface of the sensor installation section 13.

In addition, there can be considered a method of bonding to the sensor installation section 13 by using an adhesive agent, a method of inserting a bolt 43 protruding from the mounting flange 42 to a hole 13b provided in the sensor installation section 13 and fastening by a nut 44 as shown in FIG. 5, a method of punching a knock pin (not shown) to the mounting flange 42 through the hole 13b in place of the bolt and nut, and the like. In this case, in the example shown in FIGS. 1 and 2 or FIG. 5, a pair of right and left sensor installation sections 13 are formed, and the detecting surface 41a of the magnetic sensor main body 41 faces to the pulsar ring 30 from a portion 13c between the sensor installation sections 13 and 13.

The magnetic sensor main body 41 of the sensor 40 is constituted by a magnetic resistance element, a Hall element or the like, and is structured such as to generate a signal corresponding to a change of a magnetic field. Accordingly, if the S poles and the N poles magnetized in the pulsar body 32 alternately pass through a front surface of the detecting surface 41a of the magnetic sensor main body 41 in a circumferential direction on the basis of rotation of the pulsar ring 30 together with the crank shaft 4, the corresponding pulse is output. In other words, since the pulsar ring 30 and the sensor 40 structures the magnetic type rotary encoder, and a frequency of the output pulse signal is in proportion to the rotating speed of the crank shaft 4, it is possible to detect the rotating speed and the rotation angle of the crank shaft 2 so as to utilize them for various controls such as an engine ignition timing control and the like.

In the structure mentioned above, it is possible to previously attach the sealing device body 20 and the sensor 40 to the retainer 10. Accordingly, it is possible to handle the retainer 10, the sealing device body 20 and the sensor 40 as an integral assembly. Further, since it is possible to simultaneously attach the sealing device body 20 to the engine and attach the sensor 40 by attaching the installation flange section 12 of the retainer 10 to the end surface of the engine block 2 by a plurality of bolts 14 so as to connect to the upper edge of the oil pan 3, as shown in FIG. 2, it is possible to easily and rapidly execute the work. Further, since the sensor 40 is not directly attached to the engine block 2, the shape of the engine block 2 is not complicated.

Further, since the pulsar body 32 protruding toward the engine block 2 side from the holder 31 of the pulsar ring 30 is inserted to the portion between the peripheral edge 12b of the retainer 10 protruding toward the outer side of the engine block 2 and the fitting tube section 11, that is, the pulsar body 32 extends in a circumferential direction coaxial with the fitting tube section 11 through the portion between the fitting tube section 11 in the retainer 11 and the sensor installation section 13, the sensor 40, the pulsar body 32 and the sealing device body 20 are arranged side by side in the diametrical direction, and the installing space in the diametrical direction can be accordingly made small.

After the engine oil supplied to the inner periphery of the bearing portion 2a of the engine block 2, to which the crank shaft 4 is inserted, lubricates the bearing portion 2a, a part of the engine oil tends to flow out to the outer side of the engine block 2. However, the outflow is inhibited by the seal lip 22 of the sealing device body 20, and the engine oil comes down into the oil pan 3. At this time, the sliding portion between the seal lip 22 of the sealing device body 20 and the crank shaft 4 is well lubricated by the engine oil.

Further, since the pulsar body 32 protruding toward the engine block 2 side from the holder 31 of the pulsar ring 30 is inserted to the space between the peripheral edge 12b of the retainer 10 protruding toward the outer side of the engine block 2 and the fitting tube section 11, a labyrinth-shaped space S having a zigzag bent cross sectional shape is formed between the retainer 10 and the pulsar ring 30, as shown in FIG. 2. Accordingly, it is possible to effectively prevent the dust or the like from making an intrusion into the sealing device body 20 from the outer portion, on the basis of a labyrinth seal effect, and it is possible to assist a seal effect by the dust lip 23.

INDUSTRIAL APPLICABILITY

As mentioned above, the sealing device with the sensor in accordance with the present invention can be preferably carried out as the sealing means for the engine oil supplied for lubricating the bearing portion rotatably supporting the crank shaft, it is possible to reduce the installing space, and it is possible to provide the structure which does not involve a complication of the sensor for detecting the shaft rotation.

What is claimed is:

1. A sealing device with a sensor comprising:
    a retainer having a fitting tube section extending axially to which a rotary shaft is inserted and an installation flange section formed with and extending radially outward from an axial end of the fitting tube section and including periphery holes to fix the retainer to a stationary structure, the installation flange section having a sensor installation section extending axially and radially outward thereof, said installation flange section and said fitting tube section forming a monolithic member;
    a sealing device body fitted to said fitting tube section and slidably brought into close contact with an outer peripheral surface of said rotary shaft,
    a sensor detecting a rotation of a pulsar ring is attached to said sensor installation section;
    said sensor installation section being concentric to said installation flange section, said installation flange section and said sensor installation section defining a radial spacing therebetween;
    said pulsar ring received within said radial spacing; and
    said sensor installation section is located radially outward from said periphery holes.

2. The sealing device with a sensor as claimed in claim 1, wherein a detected portion of the pulsar ring is formed in a cylindrical shape, and extends in a circumferential direction coaxial with said fitting tube section within said radial spacing between the fitting tube section of the retainer and the sensor installation section.

3. The sealing device with a sensor as claimed in claim 1, wherein said periphery holes are located radially between an outer periphery of said installation flange section and said fitting tube section and said sensor installation section is located at said outer periphery.

4. The sealing device with a sensor as claimed in claim 1, wherein said sensor installation section is axially aligned with said fitting tube section.

5. A sealing device with a sensor comprising:
    a retainer having a fitting tube section extending axially to which a rotary shaft is inserted and an installation flange section formed with and extending radially outward from an axial end on an outer periphery of the fitting tube section and including periphery holes to fix the retainer to a stationary structure, the installation flange section having a sensor installation section extending axially and radially outward thereof, said installation flange section and said fitting tube section forming a monolithic member;

a sealing device body fitted to said fitting tube section and slidably brought into close contact with an outer peripheral surface of said rotary shaft, a sensor detecting a rotation of a pulsar ring is attached to said sensor installation section;

said sensor installation section being concentric to said installation flange section, said installation flange section and said sensor installation section defining a radial spacing therebetween;

said pulsar ring received within said radial spacing;

the fitting tube section and the sensor installation section arranged to have a majority of the pulsar ring located radially therebetween and axially aligned therewith; and said sensor installation section is located radially outward from said periphery holes.

6. The sealing device with a sensor as claimed in claim 5, wherein said sensor installation section is axially aligned with said fitting tube section.

* * * * *